United States Patent [19]

Anderson

[11] Patent Number: 5,227,091

[45] Date of Patent: Jul. 13, 1993

[54] ANTISTATIC POLY(VINYL CHLORIDE) COMPOSITION

[75] Inventor: Barbara J. Anderson, Saltsburg, Pa.

[73] Assignee: PPG Industries, Inc., Pittsburgh, Pa.

[21] Appl. No.: 784,831

[22] Filed: Oct. 30, 1991

[51] Int. Cl.$^5$ .............................................. H01B 1/00
[52] U.S. Cl. .................................... 252/500; 252/512; 252/518; 524/224; 524/376; 524/217; 524/366; 524/378; 568/613
[58] Field of Search ................ 252/500, 8.8, 8.9, 547, 252/174.21; 568/613; 524/224, 376, 217, 366, 378

[56] References Cited

U.S. PATENT DOCUMENTS

| | | | |
|---|---|---|---|
| 2,897,170 | 7/1959 | Gruber | 260/32.64 |
| 3,117,113 | 1/1964 | Tudor | 260/92.8 |
| 3,972,855 | 8/1976 | Martinsson et al. | 260/567.6 |
| 4,083,872 | 4/1978 | Schwarze et al. | 260/584 |
| 4,096,332 | 6/1978 | Kalopissis et al. | 544/174 |
| 4,604,414 | 8/1986 | Kato et al. | 524/378 |
| 4,662,514 | 5/1987 | Berbeco | 252/500 |
| 4,906,681 | 3/1990 | Wozniak | 524/376 |
| 4,980,205 | 12/1990 | Haskell | 252/500 |

FOREIGN PATENT DOCUMENTS 113044 5/1988 Japan.

OTHER PUBLICATIONS

Plastic Additives Technical Bulletin, "Cyastat ® SN Antistatic agent".

Primary Examiner—Paul Lieberman
Assistant Examiner—M. Kopec
Attorney, Agent, or Firm—George D. Morris

[57] ABSTRACT

Antistatic additive composition comprises first quaternary ammonium salt represented by the formula

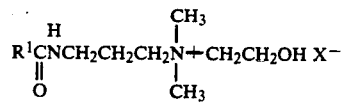

where $R^1$ is an aliphatic hydrocarbon group containing from about 11 to about 21 carbon atoms and $X^-$ is anion, and polyether represented by the formula $$CH_3O(EO)_m(PO)_nH$$

where E is bivalent ethylene, PO is bivalent propyleneoxy derived from propylene oxide, the average value of n is in the range of from 0 to about 8, and the average value of m is greater than the average value of n and is in the range of from about 1 to about 12. Preferably second quaternary ammonium salt represented by the formula

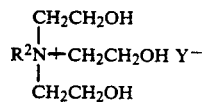

where $R^2$ is an alkyl group containing from 1 to about 4 carbon atoms and $Y^-$ is an anion, is also present. The antistatic additive compositions may be admixed with poly(vinyl chloride) to impart antistatic properties to the poly(vinyl chloride) composition.

18 Claims, No Drawings

ANTISTATIC POLY(VINYL CHLORIDE) COMPOSITION

Poly(vinyl chloride), also known as "PVC", is a known polymer having many uses. Films of PVC have been used as packaging films for many articles. However, PVC is an electrical insulator and electrostatic charges therefore tend to accumulate on the surfaces of articles prepared from PVC. PVC films are rarely used to package materials such as electronic components, electronic instruments, explosives, and propellants, which can be damaged or destroyed by accumulated electrostatic charges. In the case of explosives and propellants the accumulation of electrostatic charges can be of immediate danger. In the case of electronic components and instruments, the danger can remain latent until reliance is made upon such components or instruments only to find that they have failed.

An antistatic additive composition has now been found which is able to effectively dissipate electrostatic charges when formulated with PVC. Accordingly one embodiment of the invention is antistatic additive composition comprising: (a) first quaternary ammonium salt represented by the formula

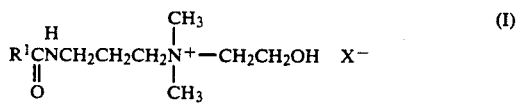

where $R^1$ is an aliphatic hydrocarbon group containing from about 11 to about 21 carbon atoms and $X^-$ is an anion, (b) polyether represented by the formula

where E is bivalent ethylene, PO is bivalent propyleneoxy derived from propylene oxide, the average value of n is in the range of from 0 to about 8, and the average value of m is greater than the average value of n and is in the range of from about 1 to about 12, and (c) optionally, second quaternary ammonium salt represented by the formula

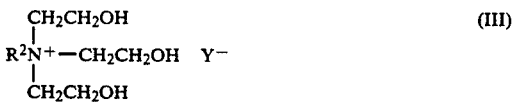

where $R^2$ is an alkyl group containing from 1 to about 4 carbon atoms and $Y^-$ is an anion.

Another embodiment of the invention is an antistatic poly(vinyl chloride) composition comprising: (a) poly(vinyl chloride), (b) first quaternary ammonium salt represented by the formula

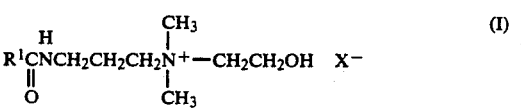

where $R^1$ is an aliphatic hydrocarbon group containing from about 11 to about 21 carbon atoms and $X^-$ is an anion, (c) polyether represented by the formula

where E is bivalent ethylene, PO is bivalent propyleneoxy derived from propylene oxide, the average value of n is in the range of from 0 to about 8, and the average value of m is greater than the average value of n and is in the range of from about 1 to about 12, and (d) optionally, second quaternary ammonium salt represented by the formula

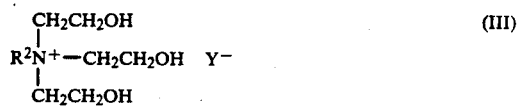

where $R^2$ is an alkyl group containing from 1 to about 4 carbon atoms and $Y^-$ is an anion.

The components of the antistatic additive composition, that is, the first quaternary ammonium salt, the polyether, and, optionally, the second quaternary ammonium salt, are themselves well known. It has now been found that their use in combination often provides benefits which are not realized from their separate use. In many cases the PVC composition containing the combination of additives passes the static dissipative requirements of Military Specification MIL-B-81705B dated Aug. 15, 1974 and entitled "BARRIER MATERIALS, FLEXIBLE, ELECTROSTATIC-FREE, HEAT SEALABLE." Another benefit is that the combination provides antistatic characteristics while often providing little or no visible discoloration. This latter benefit is particularly noteworthy since the many of the prior antistatic PVC compositions were adversely discolored by the antistatic compounds present. An especially preferred embodiment of the present invention is antistatic PVC film which is transparent so that articles packaged by the film can be viewed without opening the package.

The $R^1$ group of the first quaternary ammonium salt of Formula (I) is an aliphatic hydrocarbon group containing from about 11 to about 21 carbon atoms. From about 13 to about 17 carbon atoms is preferred. The aliphatic hydrocarbon group may be branched or straight, but preferably it is straight. In most cases the aliphatic hydrocarbon group is alkyl, alkenyl, or alkadienyl. The preferred aliphatic hydrocarbon groups correspond to those attached to the carboxyl groups of monocarboxylic acids derived from the triglycerides of natural fats or oils and to those produced by hydrogenating any of the foregoing which are unsaturated. The heptadecyl group is especially preferred.

The identity of $X^-$ may be widely varied. In general any anion which will balance the charge of the quaternary ammonium cation may be used. Examples of suitable anions include $NO_3^-$, $SO_4^{--}/2$, $Cl^-$, $Br^-$, $R^3SO_4^-$ where $R^3$ is alkyl containing from 1 to about 4 carbon atoms, and $R^4SO_3^-$ where $R^4$ is alkyl containing from 1 to about 4 carbon atoms. $X^-$ is preferably nitrate, viz., $NO_3^-$.

The polyether of Formula (II) usually, but not necessarily, contains one or more propyleneoxy groups. Each propyleneoxy group of the polyether may independently be $-CH(CH_3)CH_2O-$ or $-CH_2CH(CH_3)O-$.

The average value of m is greater than the average value of n. The value of m for any particular polyether compound will be a positive integer, while the average value of m for a mixture of compounds constituting the polyether may be a positive integer or a positive number which is not an integer. The value of n for any particular polyether compound will be zero or a positive integer, while the average value of n for a mixture of compounds constituting the polyether may be zero, a positive integer, or a positive number which is not an integer. The average values of m and n may be determined analytically or, as is most often the case, by a knowledge of the structures and amounts of the starting materials used to prepare the polyether.

In most cases the average value of m is in the range of from about 1 to about 12. Often the average value of m is in the range of from about 1 to about 8. Frequently the average value of m is in the range of from about 1 to about 6. From about 1 to about 2 is preferred.

Generally the average value of n is in the range of from 0 to about 8. Often the average value of n is in the range of from about 0.05 to about 8. In many cases the average value of n is in the range of from 0 to about 6. Frequently the average value of n is in the range of from about 0.05 to about 6. From about 0.1 to about 3 is preferred. From about 0.5 to about 1.9 is especially preferred.

The $R^2$ group of the second quaternary ammonium salt of Formula (III) is an alkyl group containing from 1 to about 4 carbon atoms. Examples include methyl, ethyl, propyl, isopropyl, butyl, sec-butyl, isobutyl, and tert-butyl. Ethyl is preferred.

The identity of $Y^-$ may be widely varied. In general any anion which will balance the charge of the quaternary ammonium cation may be used. Examples of suitable anions include $NO_3^-$, $SO_4^{--}/2$, $Cl^-$, $Br^-$, $R^5SO_4^-$ where $R^5$ is alkyl containing from 1 to about 4 carbon atoms, and $R^6SO_3^-$ where $R^6$ is alkyl containing from 1 to about 4 carbon atoms. $Y^-$ is preferably ethyl sulfate, viz., $CH_3CH_2SO_4^-$.

The relative amounts of the first quaternary ammonium salt of Formula (I), the polyether of Formula (II), and, when used, the second quaternary ammonium salt of Formula (III) present in the antistatic additive composition and in the antistatic poly(vinyl chloride) composition are subject to wide variation.

Usually the antistatic additive composition and the antistatic poly(vinyl chloride) composition comprise from about 10 to about 70 percent by weight of the first quaternary ammonium salt, based on the total weight of the first quaternary ammonium salt, the polyether, and, when used, the second quaternary ammonium salt. Often the antistatic additive composition and the antistatic poly(vinyl chloride) composition comprise from about 12 to about 50 percent by weight of the first quaternary ammonium salt on the same basis. From about 12 to about 20 percent by weight on the same basis is preferred.

Generally the antistatic additive composition and the antistatic poly(vinyl chloride) composition comprise from about 20 to about 75 percent by weight of the polyether, based on the total weight of the first quaternary ammonium salt, the polyether, and, when used, the second quaternary ammonium salt. Frequently the antistatic additive composition comprises from about 30 to about 60 percent by weight of the polyether on the same basis. From about 45 to about 55 percent by weight on the same basis is preferred.

In most cases the antistatic additive composition comprises from about 0 to about 65 percent by weight of the second quaternary ammonium salt, based on the total weight of the first quaternary ammonium salt, the polyether, and, when used, the second quaternary ammonium salt. Often the antistatic additive composition comprises from about 15 to about 65 percent by weight of the second quaternary ammonium salt on the same basis. In many cases the antistatic additive composition comprises from about 20 to about 50 percent by weight of the second quaternary ammonium salt on the same basis. From about 30 to about 40 percent by weight on the same basis is preferred.

The first quaternary ammonium salt, the polyether, and, when used, the second quaternary ammonium salt may conveniently be admixed to form an antistatic additive composition which can later be admixed with poly(vinyl chloride), or they may be admixed with poly(vinyl chloride) to form a concentrate which is later formulated with further amounts of poly(vinyl chloride) to provide an end-use composition, or they may be admixed with poly(vinyl chloride) to provide an end-use composition.

The poly(vinyl chloride) is itself well known. In most cases the poly(vinyl chloride) is a homopolymer of vinyl chloride but it may be a copolymer of vinyl chloride and a small proportion of one or more comonomers such as vinyl acetate, vinylidene chloride, diethyl fumarate, diethyl maleate, and/or acrylic esters. Generally less than about 20 percent by weight of the copolymer is derived from the comonomer(s). Often less than about 10 percent by weight of the copolymer is derived from the comonomer(s). Preferably the poly(vinyl chloride) is the poly(vinyl chloride) homopolymer.

The number average molecular weight of the poly(vinyl chloride) is usually in the range of from about 13,000 to about 200,000. Often the number average molecular weight is in the range of from about 15,000 to about 120,000. From about 20,000 to about 80,000 is preferred. Procedures for determining the number average molecular weight of poly(vinyl chloride) are well known.

Inasmuch as the antistatic PVC compositions may be formulated for their ultimate end uses or they may be formulated as concentrates intended to be let down with further quantities of poly(vinyl chloride) to produce end use compositions, the amounts of poly(vinyl chloride), first quaternary ammonium salt, polyether, and optionally second ammonium salt present in the antistatic PVC compositions may be widely varied.

The poly(vinyl chloride) in most cases constitutes from about 50 to about 99.9 percent by weight of the antistatic PVC composition. Often the poly(vinyl chloride) constitutes from about 75 to about 99.5 percent by weight of the antistatic PVC composition. From about 85 to about 99 weight percent is preferred.

The sum of the weights of the first quaternary ammonium salt, polyether, and, when present, second quaternary ammonium salt generally constitutes from about 0.1 to about 5 percent by weight of the antistatic poly(vinyl chloride) composition. The sum of such weights frequently constitutes from about 0.3 to about 3 percent by weight of the poly(vinyl chloride) composition. From about 0.5 to about 1.5 percent by weight is preferred.

Other materials may optionally be present in the antistatic PVC composition. Examples of such optional materials include plasticizers, heat stabilizers, ultraviolet light stabilizers, lubricants, processing aids, impact modifiers, polymers of types other than PVC, fillers, pigments, and dyes. This listing of optional ingredients is by no means exhaustive. These and other ingredients may be employed in their customary amounts for their customary purposes so long as they do not conflict with good polymer formulating practice.

The antistatic PVC composition may be a rigid PVC composition, a semi-rigid PVC composition, or a flexible PVC composition. The rigid PVC compositions contain less than about 1 part of plasticizer per 100 parts of poly(vinyl chloride), by weight. In most cases the rigid PVC compositions are substantially unplasticized PVC compositions. The semi-rigid PVC compositions contain from about 1 to about 33 parts of plasticizer per part of poly(vinyl chloride), by weight. The flexible PVC compositions contain more than 33 parts of plasticizer per part of poly(vinyl chloride) by weight. Usually the flexible PVC compositions contain from more than 33 to about 60 parts of plasticizer per part of poly(vinyl chloride), by weight.

The antistatic additive composition may be prepared by admixing the first quaternary ammonium salt, the polyether, and, when used, the second quaternary ammonium salt in any convenient manner. The mixing is usually accomplished at about ambient temperature.

The antistatic PVC composition may be prepared by admixing the various ingredients on a roll mill or in a mixer such as a Banbury mixer. Temperatures at which the ingredients are mixed generally range from about 20° C. to about 400° C. From about 20° C. to about 200° C. is preferred.

The antistatic PVC composition of the present invention usually has a surface resistivity of less than about $1 \times 10^{12}$ ohms (per square) when tested in accordance with ASTM-D 257-78 (Reapproved 1983), the entire disclosure of which is incorporated herein by reference. In many cases the surface resistivity is less than about $3 \times 10^{11}$ ohms (per square) when the composition is so tested. A surface resistivity of less than about $3 \times 10^9$ ohms (per square) is preferred.

The antistatic PVC composition of the present invention generally has a static decay rate of less than about 2 seconds when tested in accordance with Military Specification MIL-B-81705B dated Aug. 15, 1974, the entire disclosure of which is incorporated herein by reference. In many cases the static decay rate is less than about 1 second when the composition is so tested. A static decay rate less than about 0.1 second is preferred.

The invention is further described in conjunction with the following examples which are to be considered illustrative rather than limiting, and in which all parts are parts by weight and all percentages are percentages by weight unless otherwise specified.

EXAMPLES

A series of compositions was tested for surface resistivity and static decay rate. For each of the compositions tested, PVC (Oxyblend ® 3704CLR57 poly(vinyl chloride), Occidental Chemical Co.) was introduced into a mixer. Additional ingredients were added and the materials were mixed until uniform to produce the composition. The composition was then pressed to 127 micrometer thick films using a PHI heated press at 191° C. and a pressure of 207 megapascals for one minute. The films were equilibrated for 24 hours at 12 percent relative humidity in a humidity controlled glove box prior to testing for surface resistivity and static decay rate. Testing for surface resistivity was in accordance with ASTM-D 257-78 (Reapproved 1983) using a Dr. Thiedig MILLI-to-2 Surface Resistivity Meter and an ETS Model #802 Surface Resistivity Probe. Testing for static decay rate was in accordance with Military Specification MIL-B-81705B dated Aug. 15, 1974 using an ETS Model #406C Static Decay Meter. The identities of the ingredients, the proportions of ingredients in the compositions, and the results of testing are shown in Table 1.

TABLE 1

| Abbreviation | Ingredient |
|---|---|
| PVC | Oxyblend ® 3704CLR57 poly(vinyl chloride), Occidental Chemical Co.; CAS Registry Number 9002-86-2 |
| QAS-1 | (2-Hydroxyethyl)dimethyl(3-stearamidopropyl) ammonium nitrate; CAS Registry Number 2764-13-8 |
| QAS-2 | Ethyltris(2-hydroxyethyl)ammonium ethyl sulfate; CAS Registry Number 31774-90-0 |
| PE | Polyether of Formula (II) where m = 1.90 and n = 1.35; CAS Registry Number 9063-06-3 |

TABLE 2

| Example | 1 | 2 | 3 (comparative) |
|---|---|---|---|
| Ingredient, parts by wt. | | | |
| PVC | 99 | 99 | 99 |
| QAS-1 | 0.5 | 0.166 | 0 |
| QAS-2 | 0 | 0.334 | 1 |
| PE | 0.5 | 0.5 | 0 |
| Surface Resistivity, ohms (per square) | $1.52 \times 10^{11}$ | $2.33 \times 10^9$ | $>1.55 \times 10^{13}$ |
| Static Decay Rate, seconds | 1.87 | 0.03 | >60 |

The data show (1) that the presence of (2-hydroxyethyl)dimethyl(3-stearamidopropyl)ammonium nitrate and the polyether resulted in a poly(vinyl chloride) composition having acceptably low surface resistivity and acceptably short static decay rate, (2) that the presence of (2-hydroxyethyl)dimethyl(3-stearamidopropyl)ammonium nitrate, ethyltris(2-hydroxyethyl)ammonium ethyl sulfate, and the polyether resulted in a poly(vinyl chloride) composition having an even more acceptable lower surface resistivity and an even more acceptable shorter static decay rate, and (3) the presence of ethyltris(2-hydroxyethyl)ammonium ethyl sulfate as the only additive resulted in a poly(vinyl chloride) composition having an unacceptably high surface resistivity.

Although the present invention has been described with reference to specific details of certain embodiments thereof, it is not intended that such details should be regarded as limitations upon the scope of the invention except insofar as they are included in the accompanying claims.

I claim:

1. Antistatic additive composition comprising:
   (a) from about 10 to about 70 percent by weight of first quaternary ammonium salt represented by the formula

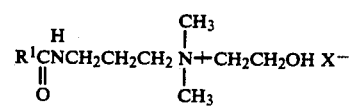

where $R^1$ is an aliphatic hydrocarbon group containing from about 11 to about 21 carbon atoms and $X^-$ is an anion,
   (b) from about 20 to about 75 percent by weight of polyether represented by the formula $$CH_3O(EO)_m(PO)_nH$$

where E is bivalent ethylene, PO is bivalent propyleneoxy derived from propylene oxide, the average value of n is in the range of from 0 to about 8, and the average value of m is greater than the average value of n and is in the range of from about 1 to about 12, and (c) from 0 to about 65 percent by weight of second quaternary ammonium salt represented by the formula

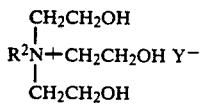

where $R^2$ is an alkyl group containing from 1 to about 4 carbon atoms and $Y^-$ is an anion, wherein each percentage is based on the total weight of said first quaternary ammonium salt, said polyether, and said second quaternary ammonium salt.

2. The antistatic additive composition of claim 1 wherein $R^1$ contains from about 13 to about 17 carbon atoms.

3. The antistatic additive composition of claim 1 wherein $R^1$ is heptadecyl and $X^-$ is nitrate.

4. The antistatic additive composition of claim 1 wherein $R^2$ is ethyl and $Y^-$ is ethyl sulfate.

5. The antistatic additive composition of claim 1 which comprises from about 15 to about 65 percent by weight of said second quaternary ammonium salt, the percentage being based on the total weight of said first quaternary ammonium salt, said polyether, and said second quaternary ammonium salt.

6. The antistatic additive composition of claim 1 wherein:

(a) $R^1$ is heptadecyl and $X^-$ is nitrate, (b) the average value of m is in the range of from about 1 to about 2 and the average value of n is in the range of from about 0.5 to about 1.9, and (c) $R^2$ is ethyl and $Y^-$ is ethyl sulfate.

7. The antistatic additive composition of claim 6 which comprises from about 12 to about 20 percent by weight of said first quaternary ammonium salt, from about 45 to about 55 percent by weight of said polyether, and from about 30 to about 40 percent by weight of said second quaternary ammonium salt, each percentage being based on the total weight of said first quaternary ammonium salt, said polyether, and said second quaternary ammonium salt.

8. Antistatic poly(vinyl chloride) composition comprising:

(a) poly(vinyl chloride), (b) from about 10 to about 70 percent by weight of first quaternary ammonium salt represented by the formula

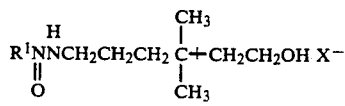

where $R^1$ is an aliphatic hydrocarbon group containing from about 11 to about 21 carbon atoms and $X^-$ is an anion, (c) from about 20 to about 75 percent by weight of polyether represented by the formula $$CH_3O(EO)_m(PO)_nH$$

where E is bivalent ethylene, PO is bivalent propyleneoxy derived from propylene oxide, the average value of n is in the range of from 0 to about 8, and the average value of m is greater than the average value of n and is in the range of from about 1 to about 12, and (d) from 0 to about 65 percent by weight of second quaternary ammonium salt represented by the formula

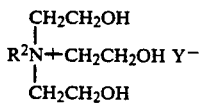

where $R^2$ is an alkyl group containing from 1 to about 4 carbon atoms and $Y^-$ is an anion, wherein each percentage is based on the total weight of said first quaternary ammonium salt, said polyether, and said second quaternary ammonium salt.

9. The antistatic poly(vinyl chloride) composition of claim 8 wherein $R^1$ contains from about 13 to about 17 carbon atoms.

10. The antistatic poly(vinyl chloride) composition of claim 8 wherein $R^1$ is heptadecyl and $X^-$ is nitrate.

11. The antistatic poly(vinyl chloride) composition of claim 8 wherein $R^2$ is ethyl and $Y^-$ is ethyl sulfate.

12. The antistatic poly(vinyl chloride) composition of claim 8 wherein the sum of the weights of said first quaternary ammonium salt, said polyether, and, when present, said second quaternary ammonium salt constitutes from about 0.1 to about 5 percent by weight of said antistatic poly(vinyl chloride) composition.

13. The antistatic poly(vinyl chloride) composition of claim 1 which comprises from about 15 to about 65 percent by weight of said second quaternary ammonium salt, the percentage being based on the total weight of said first quaternary ammonium salt, said polyether, and said second quaternary ammonium salt.

14. The antistatic poly(vinyl chloride) composition of claim 8 wherein said poly(vinyl chloride) is rigid poly(vinyl chloride).

15. The antistatic poly(vinyl chloride) composition of claim 8 wherein said poly(vinyl chloride) constitutes from about 50 to about 99.9 percent by weight of said composition.

16. The antistatic poly(vinyl chloride) composition of claim 8 wherein:

(a) $R^1$ is heptadecyl and $X^-$ is nitrate, (b) the average value of m is in the range of from about 1 to about 2 and the average value of n is in the range of from about 0.5 to about 1.9, and (c) $R^2$ is ethyl and $Y^-$ is ethyl sulfate.

17. The antistatic poly(vinyl chloride) composition of claim 16 which comprises from about 12 to about 20 percent by weight of said first quaternary ammonium salt, from about 45 to about 55 percent by weight of said polyether, and from about 30 to about 40 percent by weight of said second quaternary ammonium salt, each percentage being based on the total weight of said first quaternary ammonium salt, said polyether, and said second quaternary ammonium salt.

18. The antistatic poly(vinyl chloride) composition of claim 17 wherein:
(a) the sum of the weights of said first quaternary ammonium salt, said polyether, and, when present, said second quaternary ammonium salt constitutes from about 0.5 to about 1.5 percent by weight of said antistatic poly(vinyl chloride) composition,
(b) said antistatic poly(vinyl chloride) composition has a surface resistivity of less than about $3 \times 10^9$ ohms (per square) when tested in accordance with ASTM-D 257-78 (Reapproved 1983), and
(c) said antistatic poly(vinyl chloride) composition has a static decay rate of less than about 0.1 second when tested in accordance with Military Specification MIL-B-81705B dated Aug. 15, 1974.

* * * * *

UNITED STATES PATENT AND TRADEMARK OFFICE
CERTIFICATE OF CORRECTION

PATENT NO. : 5,227,091
DATED : July 13, 1993
INVENTOR(S) : Barbara J. Anderson It is certified that error appears in the above-identified patent and that said Letters Patent is hereby corrected as shown below:

TITLE PAGE

In the Abstract:

Second column, line 5, in the formula, "N———$CH_2$" should be ——$N^+$———$CH_2$——;

second column, line 9, "X-" should be ——$X^-$——;

second column, lines 9 and 10, "is anion" should be ——is an anion";

second column, line 20, in the formula, "N———$CH_2$" should be ——$N^+$———$CH_2$——;

Column 7, claim 8(b), line 62, in the formula, "R'NN" should be ——R'CN—— and "C———$CH_2$" should be ——$N^+$———$CH_2$——.

Signed and Sealed this

Fifteenth Day of February, 1994

Attest:

BRUCE LEHMAN

Attesting Officer     Commissioner of Patents and Trademarks